United States Patent [19]
Straza et al.

[11] 3,888,531
[45] June 10, 1975

[54] FRANGIBLE SHOCK ABSORBING BUMPER

[75] Inventors: George T. Straza; Edward L. Parr, both of El Cajon, Calif.

[73] Assignee: Straza Enterprises Ltd., El Cajon, Calif.

[22] Filed: Jan. 23, 1974

[21] Appl. No.: 424,442

Related U.S. Application Data

[63] Continuation-in-part of Ser. No. 343,189, March 21, 1973, abandoned.

[52] U.S. Cl. .................. 293/1; 188/1 C; 293/60; 293/70; 298/98
[51] Int. Cl. .... B60r 19/04; B61f 19/04; F16d 63/00
[58] Field of Search ............ 188/1 C; 293/1, 60, 70, 293/71 R

[56] References Cited
UNITED STATES PATENTS

| | | | |
|---|---|---|---|
| 2,728,479 | 12/1955 | Wheeler | 188/1 C X |
| 2,998,214 | 8/1961 | Peterman | 188/1 C X |
| 3,265,163 | 8/1966 | Gilbert et al. | 188/1 C |
| 3,506,295 | 4/1970 | Yancey | 188/1 C X |
| 3,739,882 | 6/1973 | Schwenk et al. | 188/1 C |
| 3,744,835 | 7/1973 | Carbone et al. | 293/71 R X |

FOREIGN PATENTS OR APPLICATIONS

| | | | |
|---|---|---|---|
| 1,923,305 | 10/1970 | Germany | 293/71 R |

Primary Examiner—M. Henson Wood, Jr.
Assistant Examiner—Howard Beltran
Attorney, Agent, or Firm—Brown & Martin

[57] ABSTRACT

A frangible shock absorbing and non-rebounding bumper that comprises positioning a metal honeycomb material between a forward impact bumper and a back plate, all being in the same plane. The cells in the honeycomb material extend throughout the thickness of the honeycomb material and in a direction normal to the plane, whereby major impacts against the forward impact bumper sandwiches the honeycomb material between the impact bumper and the back plate compressing and deforming the honeycomb material therebetween, and with the honeycomb material being selectively replaceable.

10 Claims, 9 Drawing Figures

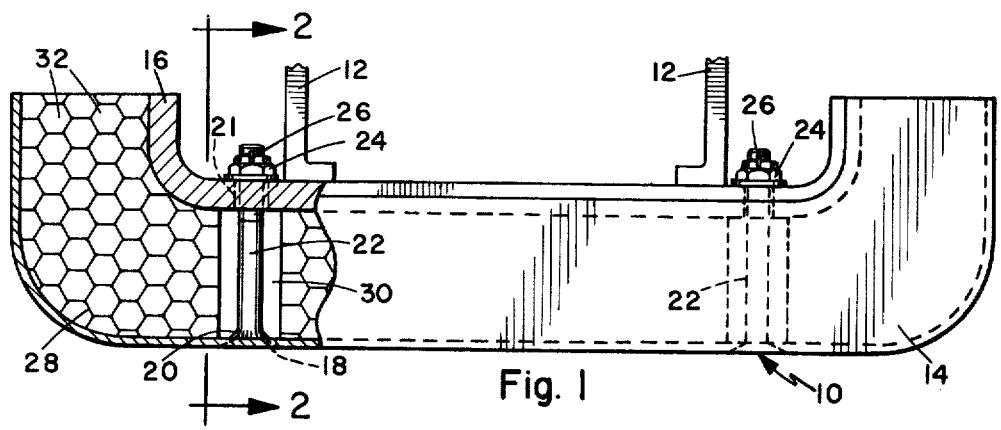
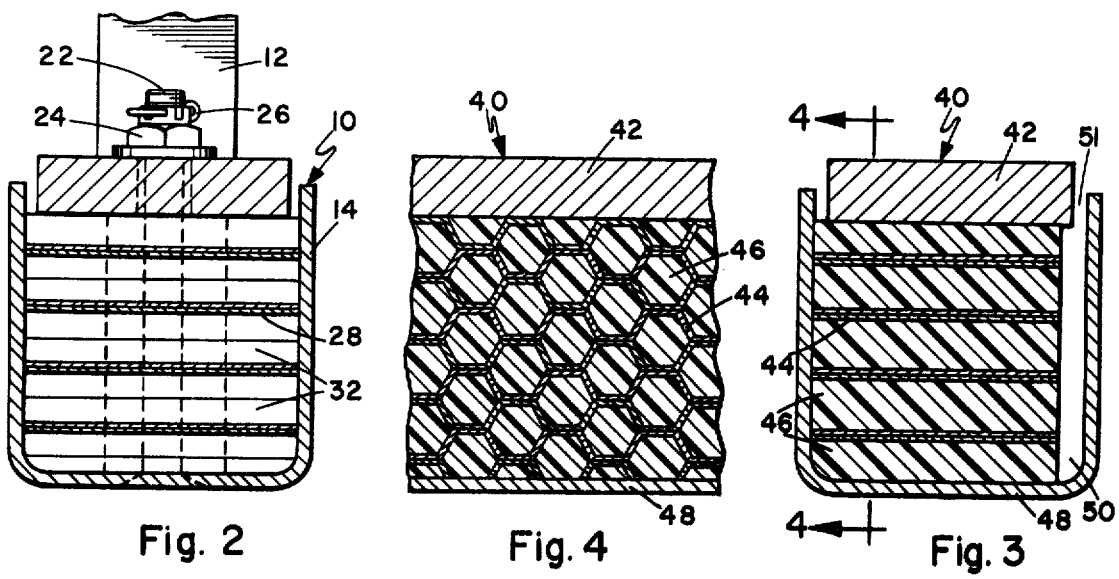
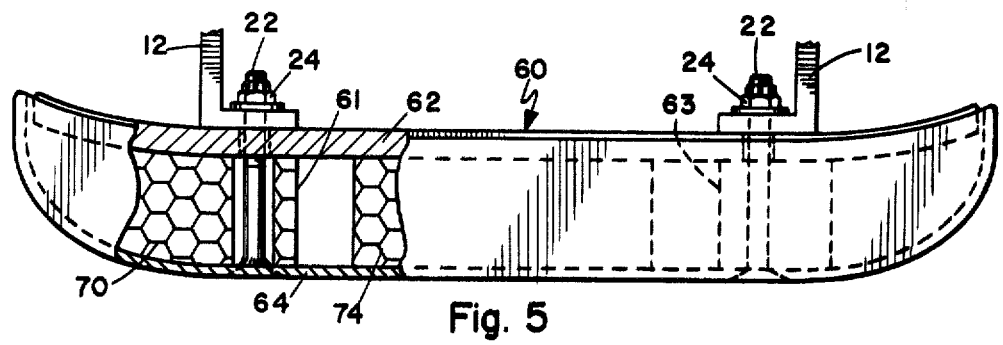
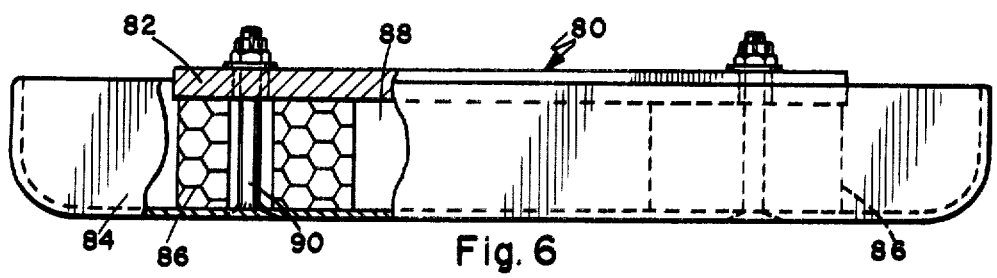

FRANGIBLE SHOCK ABSORBING BUMPER

BACKGROUND OF THE INVENTION

This application is a continuation-in-part of an earlier application, Ser. No. 343,189, filed Mar. 21, 1973 now abandoned.

Bumpers on motor vehicles and the like should normally function to protect the vehicle and the occupants from shock forces and damage, should the vehicle impact against another object. However, bumpers on motor vehicles have recently become ornamental items that afford little protection to either the vehicle or the occupants. So it has been shown that impacts against such bumpers at speeds, often less than 5 miles per hour, will often cause tremendous damage to the vehicle. While a solution to this problem could be to make the bumpers large, rigid and very strong, such bumpers would suffer from being ugly, thus distracting from the appearance of the vehicle, and also would transmit the forces of impact directly to other portions of the vehicle and to the occupants causing damage to both, even though the bumper would survive such impacts.

Accordingly many solutions and designs have been advanced to satisfy these conflicting design requirements of bumpers. Such designs have employed, for example, various resilient arrangements that will allow the bumper to move against a spring or the like, to thus absorb some of the shock of the impact without transmitting the shock back to the vehicle and the occupants of the vehicle. However, such bumpers suffer from a re-coil or re-bound that where large impacts are involved are more destructive to the vehicle and the occupants than that caused by bumpers that are only ornamental. Further such recoiling can cause a whip-lash injury to the occupants in the vehicle that is sufficiently traumatic to seriously injure the occupants, even though the vehicle was travelling at a relatively slow speed when the bumper contacted the other object. Thus it has been found necessary to provide a shock absorbing bumper in which recoil or rebound is substantially eliminated. Such bumpers often use liquid or the like that is discharged from the bumper during impact. However these bumpers have been found to be deficient in overall use because of the difficulty of using such fluids and because of other major disadvantages.

So it is advantageous to have a bumper that is capable of absorbing large shocks upon impact of the vehicle with other objects, which bumper eliminates rebound, bounce, or recoil, and which bumper provides a telescoping shock absorbing movement, and which bumper has a high resistance against deforming under lesser impacts against the bumper and has a shock absorbing element that is easily replaced after the bumper has absorbed sufficient shock to compress the shock absorbing element.

SUMMARY OF THE INVENTION

In an illustrative embodiment of this invention, the bumper has a forward impact bumper and a back plate with a metal honeycomb material positioned and sandwiched therebetween. The honeycomb material has the cells extending throughout the thickness of the honeycomb material and in a direction normal to the plane of the forward bumper and the back plate. In this bumper structure, major impacts aginst the forward bumper compresses the honeycomb material between the forward bumper and the back plate, deforming the honeycomb material. The honeycomb material thus absorbs the shock of the impact rather than the vehicle and the honeycomb material does not re-expand to create rebound, bounce or recoil.

The forward impact bumper forms a housing in which the honeycomb material is positioned. The honeycomb material, being enclosed, aids in holding the forward impact bumper in correct orientation relative to the entire bumper structure, both in normal use and during impact. Since the honeycomb material abuts against the forward bumper and the back plate, it resists deformation from small impacts and yet forms the shock absorbing and non-rebounding portion of the bumper.

The honeycomb material not being directly attached to either the forward bumper or the back plate, is held therebetween and is easily and quickly replaced after it has absorbed a major impact and is deformed. Further the honeycomb structure in one embodiment is a unitary member that fills the entire space between the forward bumper and the back plate and in other modified embodiments is positioned in sections in the forward bumper housing so that only those portions that are deformed from a major impact need be replaced. Also in another embodiment, the cells of the honeycomb material are filled partially or fully with a waxlike material that is extruded from the cell openings on impact into a space between the side of the honeycomb material and the side of the forward bumper housing. This increases the shock absorbing ability of the honeycomb material. While the honeycomb material may comprise a metal honeycomb material, other suitable honeycomb structures having the shock absorbing capabilities of the deformation of metal may be used. However the honeycomb material is a normal honeycomb material having relatively small cells in comparison to the overall size of the bumper and the honeycomb member.

In still another embodiment, the honeycomb material comprises a plurality of corrugated strips that are joined together in alignment through corresponding ridges and channels. These ridges and channels can be formed to snap the corrugated material together forming the core for insertion into the bumper housing. Thus the core can be easily and quickly replaced by forming the honeycomb material from longitudinal corrugated stips thus greatly decreasing the cost and handling of the honeycomb material core in connection with the use of the bumper.

It is therefore an object of this invention to provide a new and improved bumper structure.

It is another object of this invention to provide a new and improved shock absorbing bumper structure that is able to absorb impact shocks without recoil or rebound.

It is a further object of this invention to provide a new and improved shock absorbing bumper that utilizes honeycomb material as the shock absorbing member, which honeycomb material is easily and quickly replaced after receiving a deforming impact.

It is another object of this invention to provide a new and improved shock absorbing bumper that utilizes honeycomb material as a shock absorber which honeycomb material is easily and quickly formed from strips, that does not require welding or the like in the construction thereof.

Other objects and many advantages of this invention will become more apparent upon a reading of the following detailed description and an examination of the drawings, wherein like reference numerals designate like parts throughout and in which:

FIG. 1 is a top plan view, partially cut away, of a basic form of the bumper of this invention.

FIG. 2 is an enlarged sectional view taken on line 2—2 of FIG. 1.

FIG. 3 is a sectional view similar to FIG. 2, illustrating an alternative core structure arrangement.

FIG. 4 is a sectional view taken on line 4—4 of FIG. 3.

FIG. 5 is a top plan view, partially cut away, of an alternative bumper structure.

FIG. 6 is a top plan view, partially cut away, of still another alternative bumper structure.

Figure 7:
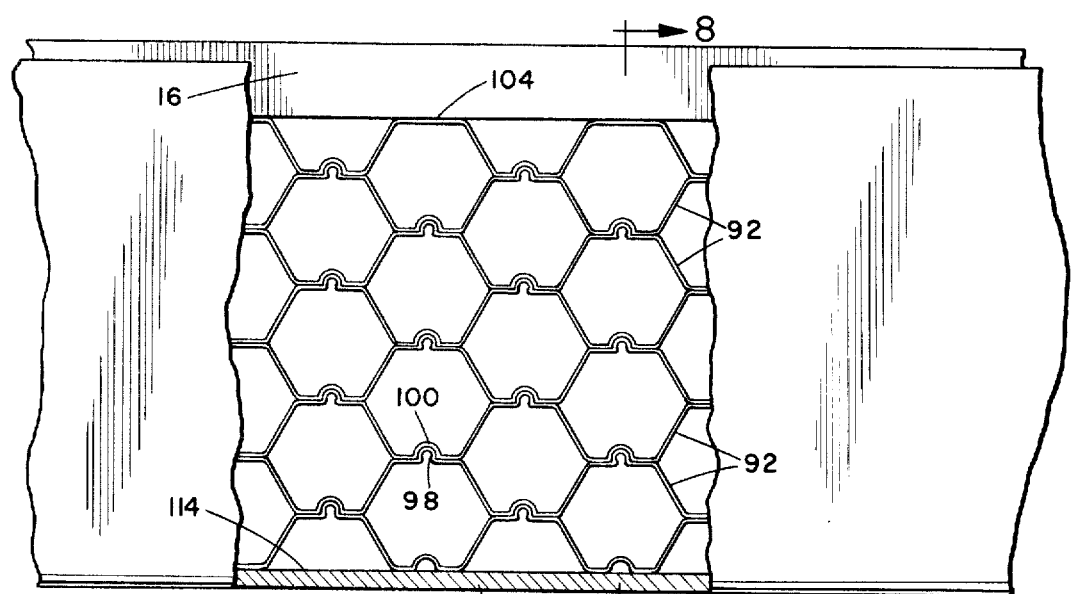
FIG. 7 is a top plan view of a portion of a bumper, partially cut away to show an alternative form of honeycomb structure.

Referring now to FIG. 1, a bumper 10 has a forward impact bumper 14 and a back plate 16. The back plate 16 is secured in any suitable manner to front extensions 12 from the frame of a vehicle, such as an automotive vehicle or the like. The extension members 12 may also be the frame of the vehicle. The extensions 12 can, as illustrated in FIG. 1, be welded directly to the back plates 16 or may be held by connecting bolts as illustrated in FIG. 5. The forward bumper 14 forms an enclosed housing with adjacent side members that extend back to the back plate 16 and project along each side thereof, thus having a "U" shaped cross section.

A normal honeycomb material 28 having cells 32 is positioned in the housing portion of the forward impact bumper 14. The front bumper 14 and the back plate 16 are parallel to each other and are in the same plane, with the cells 32 that extend throughout the entire thickness of the honeycomb material 28 being normal to the plane. In the embodiment in FIG. 1, the honeycomb material 28 is a unitary member that extends throughout the length of the forward bumper and curves around with the curved ends of the front bumper 14 and the back plate 16, and is sandwiched therebetween. A bolt 22 having a head 18, that is welded at 20 to the forward bumper 14, slidably extends through an opening 21 in the back plate 16 and threadably engages a nut 24 that is held by a cotter key 26.

In operation, the honeycomb member 28 rests in the forward bumper 14 but is not secured thereto or to the back plate 16. Bolt 22 is secured in position and the bumper is ready for use. Upon slight impacts against the forward bumper 14, the contact of the honeycomb member 28 against substantially the entire adjacent surfaces of the forward bumper and the back plate 16 provides resistance against deforming. Yet upon major impact, the forward bumper 14 will move with bolt 22 rearwardly toward the back plate 16, compressing and deforming the honeycomb material 28 therebetween. This permanently deforms the honeycomb material 28, that does not re-expand to its original condition. However the force required to so deform the honeycomb material 28 is sufficient that the bumper 10 is capable of absorbing large shocks without transmitting excessive shock forces into the vehicles and the occupants, and without destroying the front end of the vehicle. When such a large impact against the bumper 10 occurs, the honeycomb material 28 is deformed, then the honeycomb material 28 may be quickly replaced by merely diengaging the nut 24 and inserting a new unitary honeycomb member 28 into the place of the previous one.

Thus the bumper is capable of absorbing large shocks without rebound, of preventing excessive damage to the vehicle and occupants, and yet provides a deformable and easily replaceable honeycomb structure.

The honeycomb structure, while illustrated as having large openings or cells 32, would in actual structure have minute openings that are difficult to correctly illustrate in the drawing. However the openings would have that reduced size of normal honeycomb. The honeycomb 28 would normally be constructed from a metal such as for example, but not limited to, stainless steel, galvanized steel, or the like, that is joined together in any suitable manner, such as by electric welding, braising, gluing, or the like.

In another embodiment, see FIGS. 3 and 4, the bumper 40 has a back plate 42 and a forward bumper 48 with a honeycomb material 44 having cells 46. The cells 46 are filled with a wax-like material that is capable of being deformed and yet the wax-like material does not melt at normal temperatures or become excessively hard at low temperatures. In operation of this embodiment, upon impact the honeycomb material absorbs shock in the same manner as previously described relative to FIGS. 1 and 2. However the wax-like material provides a greater resistance to deforming from slight impacts and further provides a greater shock absorbing capability to very large impacts. When the bumper structure 40 experiences a very large impact, the wax-like material 46 is extruded out into opening 50 and through space 51, causing not only the extruding of a semi-solid material but also the deforming of the honeycomb material 44, creating a joint and yet coordinated shock absorbing medium that is absent of rebound.

Referring to the embodiment of FIG. 5, the bumper 60 has a back plate 62 and a forward bumper 64 and the honeycomb material is sectioned such as along lines 61 and 63. This sectioning of the honeycomb material makes it necessary to only place those sections of honeycomb material that are in fact damaged by impact and thus allows non-replacement of other portions of the honeycomb material that was not deformed during such impact. It has been found in actual tests, that the impact resistance of the honeycomb material, such as that in sections 70 and 74, have a relatively high resistance against shocks and are likely to only be deformed in the particular area of impact, assuming that the impact is at an angle toward the bumper or a one of the ends.

In FIG. 6 there is illustrated still another embodiment of a bumper 80 having a back plate 82 and a forward bumper 84. The forward bumper has the side members forming a housing, however in this embodiment only a short section 86 of honeycomb material is positioned between the forward bumper 84 and the back plate 82. These sections are located at the connecting bolts 90 and are found useful in providing a relatively inexpensive embodiment of applicants' invention for use on vehicles that are relatively small and have a light weight.

Figure 8:
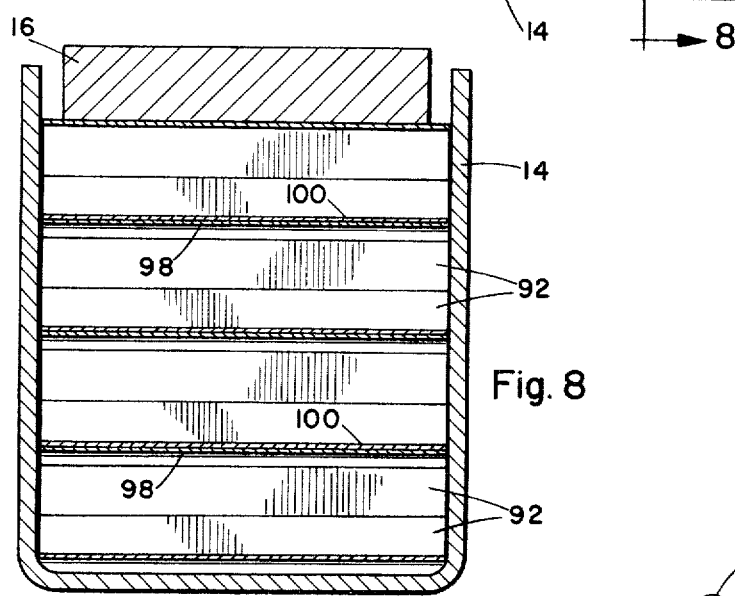
FIG. 8 is a sectional view taken on line 8—8 of FIG. 7.
Figure 9:
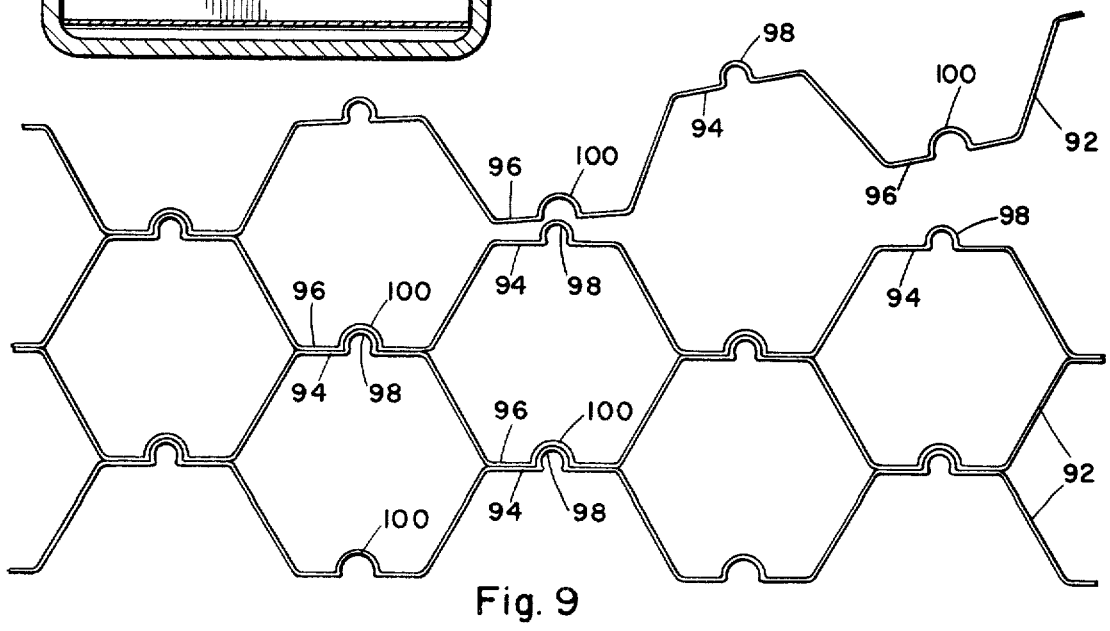
FIG. 9 is an enlarged view of the honeycomb material, illustrating the interlocking of the cell strips.

In another embodiment, see FIGS. 7, 8, and 9, a unique honeycomb material is used in the bumper constructions illustrated, for example in FIGS. 1, 5, and 6. In this embodiment, the honeycomb material comprises a plurality of strips 92. Each of these strips, which may be made of a suitable metal material, is formed into a corrugation with ridges 98 and channels 100. Each of the strips has the same shape with parallel walls 94 and 95, in which are formed the respective ridges 98 and channels 100. In this construction, the respective wall sections 94 and 95 are aligned with their opposite components in the adjacent strips. The ridge 98 has a smaller radius than channel 100. Thus the ridge 98 fits into channel 100 and is held in this position relative to the entire structure. It may be understood that this mating of the channels and ridges may be by mere insertion and alignment or the radius of the channel 100 may be slightly smaller than the outer radius of ridge 98, thus forming a snap fit that holds the honeycomb structure together. When the assembled honeycomb material is positioned in the bumper it would normally be held with the sides 102 and 104 abutting the respective housing surface 114 and the back plate 16. Thus the honeycomb structure would be held in integral assembly. However, it may also be advantageous to have the strips snap together by so sizing the channels 100 relative to ridges 98.

In operation, the honeycomb structure is assembled as illustrated in FIG. 9 and positioned either as a large integral unit in the housing of FIG. 1, or in sections as illustrated in FIGS. 5 and 6. The structure does not require in assembly any welding, gluing or cementing of the strips to other strips. All that is required is the forming and joining of the strips. In each strip, adjacent ones of the channels will have a different radius and each of the alternate channels will have the same radius. The ease with which the structure may be assembled, allows the structure to be shipped in compact strip form, and then assembled, if desired, at the point of insertion into the bumper structure. The structure may also be pre-assembled to provide an energy absorbing cartridge, ready for use in a variety of installations.

Having described our invention, we now claim.

1. A shock absorbing bumper, comprising:
    a forward impact bumper having upper and lower side plates forming a U-shaped cross section,
    a back plate for attachment to a vehicle in a plane parallel to said forward bumper,
    metal honeycomb material having a plurality of cells, with each cell extending through the entire thickness of said material in a direction substantially normal to said plane,
    said side plates abutting the upper and lower surfaces of said honeycomb material,
    said cells of said honeycomb material having wax like material therein,
    and means for securing said forward bumper to said back plate, sandwiching said honeycomb material between the forward bumper and back plate.

2. A shock absorbing bumper as claimed in claim 1 including,
    a wax like material,
    and said cells of said honeycomb material being substantially filled with said wax like material.

3. A shock absorbing bumper as claimed in claim 2 in which:
    one of said side plates of said forward bumper being spaced from the adjacent side of said honeycomb material for providing a passage for extrusions of said wax like material.

4. A shock absorbing bumper, comprising:
    a forward impact bumper,
    a back plate for attachment to a vehicle in a plane parallel to said forward bumper,
    metal honeycomb material having a plurality of cells, with each cell extending through the entire thickness of said material in a direction substantially normal to said plane,
    said metal honeycomb material comprising a plurality of corrugated metal strips,
    said strips being positioned in parallel spaced relationship with adjacent surfaces abutting and forming honeycomb spaces between respective strips,
    fastening means for holding said strips in given positions relative to each other,
    and means for securing said forward bumper to said back plate, sandwiching said honeycomb material between the forward bumper and back plate.

5. A shock absorbing bumper as claimed in claim 4 in which:
    said fastening means comprising a snap-fastening interconnector.

6. A shock absorbing bumper as claimed in claim 4 in which:
    said adjacent sides of said corrugations having mating channels with one of said channels being snap-fit into the other of said channels retaining said corrugated strips together.

7. A shock absorbing bumper as claimed in claim 4 in which:
    said fastening means comprising a channel in each of said strips with one of said channels fitting into the other of said channels.

8. A shock absorbing bumper as claimed in claim 4 in which:
    one side of each of said corrugated strips having a raised ridge on the parallel flat surfaces,
    and opposite ones of said channels having different sizes than said adjacent ones of said channels.

9. A shock absorbing bumper as claimed in claim 4 in which:
    said corrugated strips having parallel wall portions,
    each of said wall portions having a ridge and an enclosed channel on the same side of said strip,
    and alternating ones of said channels having a larger radius than the other one of said channels, whereby ridges in one of said strips fit into the corresponding channels of the adjacent strips.

10. A shock absorbing bumper as claimed in claim 9 in which:
    each of said strips having the same structure.

* * * * *